United States Patent [19]
Greenshields et al.

[11] 3,787,173
[45] Jan. 22, 1974

[54] NEW COLOURATION PROCESS

[75] Inventors: James Nairn Greenshields; Ida May Jones; John Lewis Moilliet; Victor David Poole, Manchester, all of England

[73] Assignee: Imperial Chemical Industries Limited, London, England

[22] Filed: Mar. 7, 1972

[21] Appl. No.: 232,640

[30] Foreign Application Priority Data
  Mar. 30, 1971  Great Britain...................... 8161/71
  Dec. 15, 1971  Great Britain.................... 58227/71

[52] U.S. Cl. ........................ 8/1 E, 8/21 C, 8/54.2, 8/163
[51] Int. Cl............................................. D06p 1/38
[58] Field of Search................ 8/54.2, 1 E, 1 A, 163

[56] References Cited
UNITED STATES PATENTS
3,211,513  10/1965  Ulrich et al............................ 8/54.2

Primary Examiner—Leon D. Rosdol
Assistant Examiner—T. J. Herbert, Jr.
Attorney, Agent, or Firm—Cushman, Darby and Cushman

[57] ABSTRACT

Colouration of textile materials capable of forming hydrogen bonds with amines, especially cellulosic or cellulose/polyester union materials, by impregnating the material with a water-soluble or water-dispersible compound of molecular weight above 600 containing amino or imino groups, especially a poly(ethylene imine), and subsequently contacting the material with a fibre-reactive dye; or a modification of this process wherein the material is padded or printed with a padding solution or printing paste containing a water-in-oil-in-water emulsion having the dyestuff and the compound containing amino or imino groups dissolved or dispersed in separate aqueous phases.

5 Claims, No Drawings

NEW COLOURATION PROCESS

This invention relates to a new colouration process and more particularly to a process for colouration of a range of textile materials with fibre-reactive dyes, especially cellulose-reactive dyes.

Cellulose-reactive dyes first became commercially available in 1956, but a comparatively large number have been developed commercially and made available to the public since that date. These dyestuffs generally contain a sufficiency of sulphonic acid or sulphate ester groups to make them water-soluble and also contain at least one atom or group which is capable in the presence of an alkaline substance of reacting with the hydroxyl groups of cellulose so that the dyestuff, or the remainder of the dyestuff after splitting off of this atom or group, becomes covalently linked to the cellulose molecule. Dyestuff attached to the cellulose in this manner is far more resistant to washing than the water-soluble direct dyes previously used but the methods of application used invariably cause some hydrolysis to an inert dyestuff which does not react with the cellulose molecule and would have poor fastness to washing if left in the material. From the advent of reactive dyes, therefore, it has been customary for materials dyed or printed with reactive dyestuffs to be thoroughly scoured at or near the boil with a solution of soap or detergent to remove the colouring matter which has not reacted with the fibre.

The additional scouring step customary with reactive dyes adds considerably to the cost of the process of dyeing or printing with these dyes, but to date has appeared to be indispensible.

It follows that any simple, inexpensive process which increases the fixation of reactive dyes with the textile material to near 100% will have technical and commercial interest since it will lead to an easier washing-off stage, and should give a higher tinctorial yield from the dyestuff used.

The present invention provides a method by which the fixation of reactive dyes, especially cellulose-reactive dyes, can be increased to 100% or closely approaching 100%, so that the above-mentioned scouring step can be considerably shortened or in favourable cases omitted altogether or replaced by merely a rinse in water to remove dyebath or printing paste additives and is based on the discovery that textile materials capable of hydrogen bonding with amines and which have been impregnated with water-soluble or water-dispersible compounds of molecular weight above 600 containing amino or imino groups can give an extremely high fixation of fibre-reactive dyes, fast to the usual washing and other-wet fastness tests for these dyes. This observation is unexpected since it is known that fibre-reactive dyes react more readily with amino compounds than with cellulose or other textile materials, and the amino compounds of the kind described above are believed to be held on the substrate by hydrogen bonds or similar Van der Waals forces. Hence the fastness to washing of the reaction products would be expected to be relatively low, similar, for example, to those of direct dyes.

Furthermore, it has been found that when textile materials have been impregnated with amino compounds of this kind, it is no longer necessary to add acid-binding agents or solubilising agents (e.g., urea) to the printing paste, or to add acid-binding agents or exhausting agents (e.g., salt) to the dyebath to obtain high fixation. In consequence, the printing paste or dyebath is substantially neutral and the rate of hydrolysis of reactive dyestuff is much slower than in the presence of acid-binding agent, ie., the printing paste or dyebath is more stable. If, in addition an emulsion thickener is used for making up the print paste, washing or rinsing can be omitted altogether since the solid residue left on the material is too little to affect the shade, handle or appearance of the printed textile material.

Thus according to the present invention there is provided a process for the colouration of textile materials capable of forming hydrogen bonds with amines which comprises impregnating the material with a water-soluble or water-dispersible compound of molecular weight above 600 containing amino or imino groups and subsequently contacting the material with a fibre-reactive dye.

As examples of compounds of molecular weight greater than 600 containing amino or imino groups which may be used, there may be mentioned amination products of chloromethylated polystyrene, e.g., poly(aminomethylstyrene) and poly(methylamino methylstyrene), amination products of poly(vinylchloroacetate), amination products of chloromethylated poly(diphenylether), polymers containing the following unit

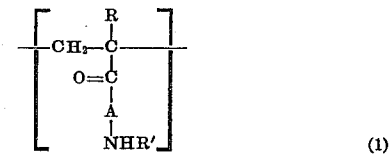

where R = H or CH$_3$, A = —OC$_2$H$_4$—, —NHC$_2$H$_4$—,

—NHCH$_2$CH$_2$CH$_2$, or —OCH$_2$CH$_2$CH$_2$, R' = H, alkyl, substituted alkyl, aryl, substituted aryl, particularly lower alkyl containing one–three carbon atoms, polymers derived from vinyl substituted heterocyclic amines or polyamines, e.g., vinyl piperidine, vinyl imidazoline or vinyl tetrahydropyrimidine, polymers containing the unit

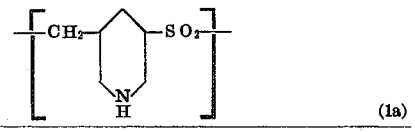

polymers derived from alkylene imines, e.g., ethylene imine or propylene imine. All the foregoing polymers may contain units derived from one or more comonomers, which may or may not contain nitrogen.

A further useful class of polymers is the so-called amine-polycondensates, e.g., polycondensation products derived from the reaction of amines or polyamines with one or more of the following - formaldehyde, an epihalohydrin, an alkylene oxide, a diglycidyl ether, an alkylene imine, or a polyhalide.

Further useful polymers are proteins, e.g., casein, polysaccharides containing amino groups, e.g., chitosan, aminated celluloses, e.g., aminoethyl cellulose, aminoethyl-carboxymethyl cellulose, aminoethyl-hydroxyethyl cellulose, aminated starches e.g., aminoethyl starch, aminated dextrins and similar substances.

These polymers can be linear or branched, or may have some degree of cross-linking. Mixtures of two or more polymers may be used.

The fibre-reactive dyestuffs used in the process must contain an atom or group capable of reacting with the hydroxyl, amino or mercapto groups of the fibre so that the dyestuff or its residue becomes covalently linked to the fibre molecule. A large number of substituents containing such groups are known from the literature on this subject, for example: vinyl sulphone and aliphatic sulphone groups which contain a halogen atom or sulphate ester groups in $\beta$-position to the sulphur atom, e.g., $\beta$-chloroethyl- or $\beta$-sulphatoethylsulphone and $\beta$-sulphatoethylsulphonylamino groups, $\alpha,\beta$-unsaturated acyl radicals or aliphatic carboxylic acids for example, acrylic acid, $\alpha$-chloroacrylic acid, propiolic acid, maleic acid and mono- and dichloro-maleic acids; also the acyl radicals of acids which contain a substituent which reacts with cellulose or polyamides in the presence of an alkali, e.g., chloroacetic acid, $\beta$-chloro-and $\beta$-bromopropionic acids and $\alpha,\beta$-dichloro- and dibromopropionic acids. Other examples of cellulose or polyamide-reactive groups are tetrafluorocyclobutane carbonyl, trifluorocyclobutene carbonyl, tetrafluorocyclobutylethenyl carbonyl, trifluorocyclobutene ethenyl carbonyl, and heterocyclic radicals which contain two or three nitrogen atoms in the heterocyclic ring and at least one cellulose- or polyamide-reactive substituent on a carbon atom of the ring.

As examples of such heterocyclic radicals, there may be mentioned, for example
2:3-dichloro-quinoxaline-5- or -6-sulphonyl,
2,4-difluoro-5-chloropyrimid-6yl,
2-methylsulphonyl-5-chloro-6-methylpyrimid-4-yl,
2:3-dichloro-quinoxaline-5- or -6-carbonyl,
2:4-dichloro-quinazoline-6- or -7-sulphonyl,
2:4:6-trichloro-quinazoline-7- or -8-sulphonyl,
2:4:7- or 2:4:8-trichloro-quinazoline-6-sulphonyl,
2:4-dichloro-quinazoline-6-carbonyl,
1:4-dichloro-phthalazine-6-carbonyl,
4:5-dichloro-pyridazon-1-ylpropionyl,
2:4-dichloro-pyrimidine-5-carbonyl,
1-(phenyl-4-carbonyl)-4:5-dichloro-pyridazone,
1-(phenyl-4-sulphonyl)-4:5-dichloro-pyridazone,
and more particularly s-triazin-2-yl and pyrimidin-2-yl or 4-yl radicals which contain an at least one of the remaining 2-, 4- and 6-positions, a bromine or, preferably, a chlorine atom, a sulphonic acid group, a thiocyanato group, an aryloxy or arylthio group containing an electronegative substituent such as sulphophenoxy, sulphophenylthio, nitrosulphophenoxy, disulphophenoxy and sulphonaphthoxy, or a group of the formula:

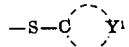

(2)

wherein $Y^1$ represents a group of atoms necessary to form a 5- or 6-membered heterocyclic ring which may carry substituents or form part of a fused ring system; or a quaternary ammonium e.g., pyridinium group; or a group of the formula:

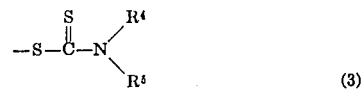

(3)

wherein $R^4$ and $R^5$ each represent the same or different alkyl, cycloalkyl, aryl or aralkyl group, or $R^4$ and $R^5$ together form, together with the nitrogen atom, a 5- or 6-membered heterocyclic ring; or a group of the formula:

(4)

wherein $R^6$ and $R^7$ may be the same or different and each represents a hydrogen atom or an alkyl, aryl or aralkyl group.

In the cases where the pyrimidine ring or triazine ring carries only one such reactive substituent, the said ring may have a non-reactive substituent on the remaining carbon atoms.

By a non-reactive substituent there is meant a group which is bound by a covalent bond to a carbon atom of the triazine or pyrimidine nucleus, which covalent bond is not ruptured under the conditions used for application of the reactive dye.

As examples of such substituents, there may be mentioned, for example, primary amino and hydroxyl groups, also mono- or di- substituted amino groups, etherified hydroxyl and etherified mercapto groups; in the case of substituted amino groups, this class includes, for example, mono- and di-alkylamino groups in which the alkyl groups preferably contain at most four carbon atoms, and which may also contain substituents for example, hydroxyl or alkoxy groups, and phenylamino and naphthylamino groups optionally containing sulphonic acid substituents; in the case of etherified hydroxyl and mercapto groups, this class includes, for example, alkoxy and alkylthio groups preferably those of low molecular weight, i.e. having up to 4 carbon atoms and phenoxy, phenylthio, naphthoxy or naphthylthio groups; as particular examples of all these classes there may be mentioned for example:
Methylamino,
ethylamino,
dimethylamino,
$\beta$-hydroxyethylamino,
di-($\beta$-hydroxyethyl)-amino,
$\beta$-chloroethylamino,
cyclohexylamino,
anilino,
sulphophenylamino,
disulphophenylamino,
N-methylsulphophenylamino,
N-$\beta$-hydroxyethylsulphophenylamino,
mono-, di- and tri-sulphonaphthylamino,
sulpho-o-tolylamino,
carboxyphenylamino and sulphocarboxyphenylamino, N-$\omega$-sulphomethylphenylamino,
methoxy, ethoxy and butoxy,
phenoxy, methylphenoxy and chlorophenoxy and phenylthio groups.

Chlorine atoms or cyano, nitro, carboxy and carbalkoxy groups in the 5-position of a pyrimidyl radical come into the category of non-reactive substituents. It is preferred, in general, that the dyestuff should contain complexly-bound metal, e.g., Cu, Cr or Co in the form of a metal-complex azo or formazan grouping or as a metal phthalocyanine.

Textile materials which may be dyed by the new process include in general, materials containing amide, hydroxyl or mercapto groups, e.g., natural proteins, polyamides, polyesters, cellulose acetates, but more especially cotton, viscose rayon, including polynosic and high wet modulus regenerated cellulose, linen and other essentially cellulosic fibres and union fibres of the above, e.g. polyester/cotton, polyester/wool, synthetic polyamide/wool, polyamide/cellulose triacetate, acrylic/cotton, acrylic/viscose rayon and acrylic/wool in the form of loose fibres, slivers, yarns, threads, woven, knitted, braided or otherwise interlaced, or unwoven sheet materials.

Impregnation of the textile material with the polymer may be carried out, e.g., by padding the material with a dilute aqueous solution or suspension of the polymer, squeezing out the excess solution and, preferably, drying. Othe methods of impregnation of the material with a suspension or solution of the polymer, include, e.g., spraying, contact with a transfer roller or the usual printing methods, e.g., by roller, screen or block.

Application of the reactive dyestuff and fixation on the textile material can be carried out by any method used in parctice or known from the literature on the subject prior to the washing step, with the difference that in the new process it is usually not necessary to add an acid-binding agent. Thus, continuous, semicontinuous or the so-called "batchwise" methods of application can be used.

Typical methods of application include e.g.:

a. The material may be dyed in the beck, winch or circulatory dyeing machine or on the jig in an aqueous saline solution of dyestuff. This method is primarily suitable for use with liquor to goods ratios of from 5:1 to 30:1 although ratios outside these limits can be used if desired.

As examples of salts which may be used to make up the saline dyebath, there may be mentioned sodium chloride and sodium sulphate. Salt concentrations of 30 g per litre to 100 g per litre are those most commonly used.

In general, the temperature of dyeing may need to be chosen to conform with the cellulose-reactive grouping present in the dyestuff. Typical recommendations are as follows:

| Reactive group | Temperature |
| --- | --- |
| monochloro-s-triazinylamino | 80°C |
| dichloro-s-triazinylamino | 30°C |
| dichloropyrimidinylamino | 80°C |
| trichloropyrimidinylamino | 80°C |
| dichlorophthalazinyl carbonly | 80°C |
| dichloroquinoxalinyl carbonyl | 40°C |
| acryloylamino | 80°C |
| dichloropyrimidyl carbonyl | 30°C |
| sulphatoethyl sulphonyl | 80°C | b. A further method of application comprises padding the material in a dyestuff solution, preferably containing a migration inhibitor, e.g., an alkyl naphthalene sulphonate, a mild oxidising agent, e.g., sodium-m-nitrobenzene sulphonate, and if necessary, a solubilising agent, e.g., urea and then, if desired after an intermediate drying step, the material is baked or steamed for a short period of time to accelerate the reaction between the dyestuff and the substrate.

c. A further method of application comprises padding the material in a dyestuff solution and thereafter wrapping the material in a cover to prevent evaporation and storing the material in a moist condition for a number of hours to effect reaction between the dyestuff and the substrate.

d. Printing by the new colouration process can be effected by application of the dyestuff by conventional methods, e.g., by roller, screen or block using a thickened aqueous or non-aqueous printing paste containing the dyestuff and the usual adjuvants, although as in other methods of applying the dyestuff it is usually not necessary to incorporate an acid-binding agent. In a preferred method of carrying out colouration by printing, the paste utilises an oil-in-water or water-in-oil emulsion as thickener; by use of an oil of relatively low boiling point, the thickener is removed on drying the printed material so that very little residue, other than dyestuff is left and washing can be dispensed with.

In a preferred modification of application by padding or printing, e.g., by procedures (b), (c) and (d) above, the dyestuff and polymer amine are applied simultaneously, but in the separate aqueous phases of water-in-oil-in-water emulsion forming or incorporated into the padding solution or printing paste. In this procedure, it is generally preferred to dissolve the dyestuff in the inner, discontinuous water phase and to dissolve the polymer in the outer, continuous water phase.

These emulsions can be manufactured in the usual manner by first making an emulsion of the aqueous liquid which is to form the innermost phase in a substantially water-immiscible organic liquid, and then dispersing this emulsion in the second aqueous liquid under such conditions that the first-made emulsion is not broken down. Whilst the choice of combinations of emulsifying agents requires some care and the final selection of these may depend on trial, possible agents and/or stabilisers for this purpose are well known. The emulsifying agents can be classified as being preferentially oil-soluble or water-soluble.

Examples of oil-soluble agents which may possibly be used are oil-soluble salts or esters of carboxylic acids, e.g., barium oleate and aluminium stearate, oil-soluble salts or esters of sulphated or sulphonated alkyl or alkyl aryl compounds, e.g., cetyl or stearyl calcium sulphates, and barium dinonyl naphthalene sulphonate, solvent soluble polymeric material for example cellulose ethers or the reaction products of copolymers of styrene, vinyl toluene and glycidyl methacrylate with hydroxy or aminocarboxylic acids, condensation products of ethylene oxide with phenols, alcohols, carboxylic acids, amines or polypropylene oxide containing a preponderance of oleophilic groups.

Examples of water-soluble agents which may possibly be used are water-soluble salts of carboxylic acids or sulphated or sulphonated alkyl or alkyl/aryl compounds, e.g., sodium stearate, lauryl sodium sulphate, sodium dodecyl benzene sulphonate, condensation products of ethylene oxide with phenols, alcohols, carboxylic acids, amines or polyprophylene oxide containing a preponderance of hydrophilic groups, a wide variety of water-soluble natural or synthetic polymeric materials, e.g., glue, gelatin and casein, polyvinyl alcohol and partially hydrolysed polyvinyl acetate, water-soluble cellulose derivatives, polymeric amine compounds such as those essential to the performance of the invention.

Agents are not necessarily used singly and combinations are frequently beneficial, it is of course essential to avoid the use of agents in either emulsification stage which will interact strongly with those used in the other stage so as to cause coalescence or reversal of either emulsion system.

The new process provides a method for colouration of textile materials, especially cellulose, in which not only the advantages mentioned above are found, but in addition it is frequently found that the shade obtained is brighter than when a conventional process is used, also that a higher tinctorial yield is obtained. Yet a further advantage lies in the possibility of dyeing and/or printing union materials, and in particular, cellulose/-polyester union materials in a homogeneous manner utilising only a cellulose reactive dyestuff instead, as at present, of having to dye with both cellulose-reactive dyes and disperse dyes in order to colour each component of the union.

The invention is illustrated but not limited by the following Examples in which parts and percentages are by weight.

EXAMPLE 1

Cotton yarn is immersed in a 1% solution of a polyethylene imine of molecular weight 60,000, squeezed, and dried in air. The yarn is washed twice in hot water and redried.

2000 parts of water containing 120 parts of salt are heated to 80°C and 100 parts of the treated yarn are added, followed by 2 parts of dyestuff (1) of Table 1 dissolved in a small amount of water. The yarn is agitated in the dye liquor at 80°C for 30 minutes, then 40 parts of sodium carbonate are added and dyeing is continued at 80°C for a further 60 minutes.

The yarn is removed from the liquor and rinsed briefly in cold water. It is dyed in a brown shade, much stronger than if the same number of parts of untreated cotton yarn are used.

EXAMPLE 2

Cotton yarn is impregnated with polyethylene imine as described in Example 1.

2000 parts of water are heated to 40°C and 100 parts of the treated cotton yarn are added, followed by 2 parts of dyestuff (2) of Table 1 dissolved in a small amount of water. The yarn is agitated in the dye liquor to 40°C for 30 minutes, and then at 80°C for 60 minutes.

The yarn is then removed from the liquor and rinsed briefly in cold water. It is dyed in a bright bluish-red shade, much stronger tinctorially than if untreated cotton yarn is used.

EXAMPLE 3

Viscose rayon piece is padded at 75% expression in a 1% solution of a polyethylene imine of molecular weight 60,000, and dried in air. The piece is washed twice in hot water and redried.

500 parts of water containing 50 parts of salt are heated to 85°C and 4 parts of the dyestuff (3) of Table 1 are added. 100 parts of the treated viscose rayon piece are added and, after 30 minutes, 10 parts of sodium carbonate are added. After a further 60 minutes, the rayon is removed from the dye liquor and rinsed briefly in cold water.

The viscose rayon is coloured a bright scarlet shade, much stronger tinctorially than if untreated viscose rayon piece is used.

EXAMPLE 4

Viscose rayon piece is impregnated with polyethylene imine as described in Example 3.

500 parts of water are heated to 40°C and 4 parts of dyestuff (4) of Table 1 are added. 100 parts of the treated viscose rayon piece are added. After 30 minutes, the temperature is raised to 85°C for 60 minutes.

The rayon is removed from the liquor and rinsed briefly in cold water. It is dyed in a greenish-yellow shade, much stronger than if untreated viscose rayon piece is used.

EXAMPLE 5

Indian head cotton cloth is padded at 75% expression in a 1% solution of a polyethylene imine of molecular weight 100,000 and dried in air. The cloth is washed twice in hot water and redried.

The treated Indian head cotton cloth is padded at 75% expression in a dye liquor containing:
16.5 parts of dyestuff (5) of Table 1
22.5 parts of salt
150 parts of urea
11.25 parts of caustic soda
1.5 parts of a wetting agent
and water to 750 parts. The cloth is placed in a polythene cover and stored for 24 hours, then rinsed in cold water.

The cloth is dyed a bright bluish-red shade, much stronger tinctorially than if untreated Indian head cotton cloth is used.

EXAMPLE 6

Indian head cotton cloth is impregnated with polyethylene imine as described in Example 5.

The treated cotton cloth is padded at 75% expression in a dye liquor containing:
13.6 parts of dyestuff (6) of Table 1
150 parts of urea
11.25 parts of sodium carbonate
1.5 parts of a wetting agent
and water to 750 parts. The cloth is dried for 3 minutes at 80°C and baked at 120°C for a further 3 minutes, then given a rinse in cold water.

The cloth is dyed a deep red-brown shade, much stronger tinctorially than if untreated cotton cloth is used.

EXAMPLE 7

Indian head cotton cloth is impregnated with polyethylene imine as described in Example 5.

The treated cotton cloth is padded at 75% expression in a dye liquor containing:
13.6 parts of dyestuff (7) of Table 1
150 parts of urea
and water to 750 parts. The cloth is dried for 3 minutes at 80°C and baked at 120°C for a further 3 minutes, then given a rinse in cold water.

EXAMPLE 8

Spun viscose rayon piece is impregnated with polyethylene imine as described in Example 3 but using a polyethylene imine of molecular weight 1800.

The treated spun viscose rayon piece is padded at 75% expression in a dye liquor containing:
27 parts of dyestuff (8) of Table 1
7.5 parts of sodium carbonate
1.5 parts of a wetting agent
and water to 750 parts. The cloth is dried at 80°C for 3 minutes and steamed at 100–120°C for 5 minutes, then rinsed in cold water.

The cloth is dyed a yellow shade, much stronger tinctorially than if untreated cloth is used.

EXAMPLE 9

Example 8 is repeated but using a dye liquor containing:
27 parts of dyestuff (9) of Table 1
1.5 parts of a non ionic wetting agent
and water to 750 parts.

The cloth is dyed a turquoise shade, much stronger tinctorally than if untreated cloth is used.

EXAMPLE 10

Indian head cotton cloth is impregnated with polyethylene imine as described in Example 5.

The treated cloth is padded at 75% expression in a dye liquor containing:
16.5 parts of dyestuff (10) of Table 1
1.5 parts of a non ionic wetting agent
and water to 750 parts. The cloth is dried for 3 minutes at 80°C and further padded in a liquor containing:
10 parts of caustic soda
300 parts of salt
and water to 1000 parts. The cloth is steamed, without drying, at 100°–120°C for 1 minute, then rinsed in cold water.

The cloth is dyed a deep blue shade, much stronger than if untreated cotton cloth is used.

EXAMPLE 11

Mercerised cotton is padded at 75% expression with a 1% aqueous solution of polyethylene imine of molecular weight 60,000 and dried. This material is then printed with a print paste of the composition:
3 parts of dyestuff (11) of Table 1
5 parts of urea
35 parts of 4% high viscosity sodium alginate (containing 1 % sodium hexametaphosphate)
1 part of sodium m-nitrobenzene sulphonate
1 part of emulsion of sulphonated sperm oil and pine oil
1.5 parts of sodium bicarbonate and
53.5 parts of water.

The printed fabric is dried and then steamed for 2 minutes under atmospheric pressure at 100°C.

The fabric is then rinsed for 10 minutes at 60°C in water.

The print obtained has a much superior colour yield to that obtained by a similar procedure using untreated mercerised cotton.

A similar effect is obtained using unmercerised cotton.

EXAMPLE 12

Example 11 is repeated using a print paste of the composition:
3 parts of dyestuff (12) of Table 1
5 parts of urea
35 parts of 4% high viscosity sodium alginate (containing 1% sodium hexametaphosphate
1 part of sodium m-nitrobenzenesulphate
1 part of an emulsion of sulphonated sperm oil and pine oil
55 parts of water.

The printed fabric is dried at 80°C and rinsed for 10 minutes at 60°C in water.

The print obtained has a much superior colour yield to that obtained from untreated mercerised cotton using the conventional print paste containing sodium bicarbonate. If the print paste free from acid-binding agent is used on untreated fabric, fixation of the dye is negligible.

EXAMPLE 13

Mercerised cotton is impregnated with polyethylene imine as described in Example 11 and dried. This padded fabric is then printed with a print paste of the composition:
3 parts of dyestuff (13) of Table 1
75 parts of an emulsion of 1.2% Dispersol PR Flakes, 18.8% water and 80% white spirit
22 parts of water.

The print is then dried at 80°C and rinsed at 60°C for 10 minutes in water.

The print obtained has a much superior colour yield to that obtained by the conventional procedure described in Example 12.

If after printing and drying at 80°C the print is baked for 3 minutes at 115°C and then washed for 10 minutes at the boil in water, only the smallest traces of colour are removed by this washing process.

EXAMPLE 14

"Terylene" polyester (70%)/cotton (30%) blend ("Terylene" is a Registered Trade Mark) is padded with 1% by weight of polyethylene imine. This fabric is then printed with a print paste of the same composition as described in the first paragraph of Example 11, but using dyestuff (14) of Table 1. After dyeing at 80°C the print is steamed for 1 minute at 100°C under atmospheric pressure and then rinsed for 10 minutes at 60°C in water.

The print obtained was of much higher colour yield and of a more solid nature than that obtained by the same process on untreated "Terylene" (70%)/cotton (30%) blend.

EXAMPLE 15

Mercerised cotton is printed with a print paste containing:
1 part of polyethylene imine
75 parts of an emulsion of
   1.2% Dispersol PR Flakes,
   18.8% water and
   80% white spirit
24 parts of water.

After drying the print is immersed in an aqueous solution of 4% salt at 40°C. After 5 minutes an aqueous solution of dyestuff (15) of Table 1 is added to give a concentration of dye in the dyebath equal to 3% of the fabric weight. After 30 minutes a solution of sodium carbonate is added to give a concentration of 1.0% sodium carbonate in the dyebath. After a further 30 minutes the sample is removed, rinsed 5 minutes in cold water and then boiled for 10 minutes in an aqueous solution of 0.1% of a mixture of an ethylene oxide/alkyl phenol condensate and a sodium salt of sulphated cetyl/oleyl alcohol.

A pattern is obtained from this process showing a strongly coloured mark where the polyethylene imine was printed on a background of a weaker shade of the same dye, brought about by the higher colour yield associated with the polyethylene treated areas.

In any of the foregoing Examples the polyethylene imine used may have a molecular weight of 600 or 1200 or be replaced by polymers of the formula:

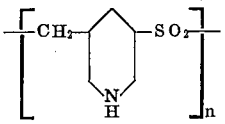

or

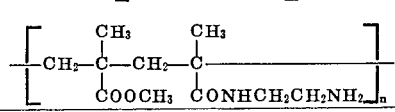

Table 1 names the dyestuffs used in Examples 1 to 15 together with a number of other dyestuffs, all of which can be used equally in the Examples.

Table 1

| No. | | Shade |
|---|---|---|
| 1 | The condensation product of cyanuric chloride with 1 mole of 4-nitro-4'-aminostilbene-2,2'-disulphonic acid and ½mole of the 1:2-Cr complex of 6-amino-2-(2'-carboxyphenylazo)-1-naphthol-3-sulphonic acid | Brown |
| 2 | The condensation product of cyanuric chloride with 1 mole of 8-amino-2-(4'-methoxyphenylazo)-1-naphthol-2',3,6-trisulphonic acid and 1 mole of ammonia | Bluish-red |
| 3 | The condensation product of 2,4-dichloro-6-methoxy-s-triazine with 6-methylamino-2-(4'-methoxyphenylazo)-1-naphthol-2',3-disulphonic acid | Bright red |
| 4 | The condensation product of cyanuric chloride with 1 mole of 1-(β-aminoethyl)-3-cyano-4-methyl-5-(2',5'-disulphophenylazo)-6-hydroxypyrid-2-one and one mole of ammonia | Greenish yellow |
| 5 | The condensation product of cyanuric chloride with 1 mole of 8-amino-2-(4'-methylphenylazo)-1-naphthol-2',3,6-trisulphonic acid and 1 mole of ammonia | Bluish-red |
| 6 | The condensation product of 2,4-dichloro-6-methoxy-s-triazine (2 moles) with the 1:2-Cr complex of 6-amino-2-(2'-carboxyphenylazo)-1-naphthol-3-sulphonic acid | Red-brown |
| 7 | The condensation product of cyanuric chloride with 1 mole of 2-(4'-amino-2'-methylphenylazo)naphthalene-4,8-disulphonic acid | Reddish-yellow |
| 8 | The condensation product of 2,4-dichloro-6-methoxy-s-triazine (2 moles) with the 1:2-Cr complex of 1-(3'-aminophenyl)-3-methyl-4-(2''-carboxy-4''-sulphophenylazo)-5-pyrazolone | Yellow |
| 9 | The condensation product of 2,4-dichloro-6-methoxy-s-triazine with copper phthalocyanine mono-3-sulphonamide mono-N-(3'-amino-40'-sulphophenyl)-3-sulphonamide-di-3-sulphonic acid | Bright greenish-blue |
| 10 | The condensation product of cyanuric chloride with 1 mole of 1-amino-4-[3'-(4''-aminophenylaminosulphonyl)anilino]anthraquinone-2,2''-disulphonic acid and 1 mole of ammonia | Blue |
| 11 | The condensation product of 2,4-dichloro-6-methoxy-s-triazine with 1 mole of 6-amino-1-hydroxy-2,2'-azonaphthalene-1',3,5-trisulphonic acid | Orange |
| 12 | The condensation product of cyanuric chloride with 1 mole of 6-ureido-2-(5'-aminophenylazo)-1-naphthol-2',3,4'-trisulphonic acid and 1 mole of ammonia | Orange |
| 13 | The condensation product of 2,4-dichloro-6-methoxy-s-triazine with 1 mole of the 1:1-Cu complex of 8-amino-2-(2'-hydroxyphenylazo)-1-naphthol-3,3',5,6'-tetrasulphonic acid | Purple |
| 14 | The condensation product of cyanuric chloride with 1 mole of 8-amino-2-phenylazo-1-naphthol-2',3,6-trisulphonic acid | Red |
| 15 | The condensation product of cyanuric chloride with 1 mole of 1-(4'-sulphophenyl-3-carboxy-4-(5''-amino-2''-sulphophenylazo-5-pyrazolone | Greenish-yellow |
| 16 | The condensation product of cyanuric chloride with 1 mole of the 1:1-Cu complex of 6-amino-2-(2'-hydroxyphenylazo)-1-naphthol-3,5,5'-trisulphonic acid and 1 mole of aniline-3-sulphonic acid | Dull bluish-red |
| 17 | Mono-(3-β-chloroethylaminosulphonyl) copper phthalocyanine tri-3-sulphonic acid | Bright greenish-blue |
| 18 | The condensation product of 1,3-phenylene diamine-4-sulphonic acid with 1 mole of dyestuff 14 and 1 mole of 2,4-dichloro-6-methoxy-s-triazine | Bluish-red |
| 19 | The condensation product of 2,4-dichloro-6-amino-s-triazine (2 moles) with 1 mole of 7-methylamino-2-(5'-aminophenylazo)-1-naphthol-2',3,4'-trisulphonic acid | Orange |
| 20 | The condensation product of 2,4-dichloro-6-amino-s-triazine (2 moles) with 1 mole of the 1:2-Cr complex of 8-amino-2-(5'-nitro-2'-hydroxyphenylazo)-1-naphthol-3,6-disulphonic acid | Greenish-blue |
| 21 | The condensation product of cyanuric chloride with 1 mole of 6-amino-2-(4'-methoxyphenylazo)-1-naphthol-2',3-disulphonic acid | Bright-red |
| 22 | The condensation product of dyestuff 14 with 1 mole of 4-sulpho-2-carboxy aniline | Bluish red |
| 23 | The condensation product of 2,4-dichloro-6-methoxy-s-triazine with 1 mole of 1-amino-4-(3'-amino-2',4',6'-trimethylanilino)anthraquinone-2,5'-disulphonic acid | Bright reddish-blue |
| 24 | The condensation product of cyanuric chloride with 1 mole of 1-phenyl-3-carboxy-4-(5''-aminophenylazo)-5-pyrazolone-3',2''-disulphonic acid and 1 mole of 5-sulpho-2-carboxyaniline | Greenish-yellow |
| 25 | The condensation product of 2 moles of 2,4-dichloro-6-(4'-sulphoanilino)-s-triazine with 1-(3'-amino-2'-methyl phenyl)-3-methyl-4-(5''-aminophenylazo)-5-pyrazolone-2'',5'-disulphonic acid | Greenish-yellow |
| 26 | The condensation product of 1 mole of acryloyl chloride and 1 mole of 6-amino-2-(4'-methoxyphenylazo)-1-naphthol-2',3-disulphonic acid | Scarlet |
| 27 | The condensation product of 1 mole of β-(tetrafluorocyclobutyl)acryloyl chloride and 1 mole of 6-amino-2-(4'-methoxyphenylazo)-1-naphthol-2',3-disulphonic acid | Scarlet |
| 28 | The condensation product of 1 mole of 2,3-dichloroquinoxalin-6-carbonyl chloride and 1 mole of 6-amino-2-(4'-methoxyphenylazo)-1-naphthol-2',3-disulphonic acid | Scarlet |
| 29 | The condensation product of 1 mole of 2,4,6-trichloro-5-cyanopyrimidine and 1 mole of 6-amino-2-(4'-methoxyphenylazo)-1-naphthol-2',3-disulphonic acid | Scarlet |
| 30 | The condensation product of 1 mole of chloroacetyl chloride and 1 mole of 6-amino-2-(4'-methoxyphenylazo)-1-naphthol-2',3-disulphonic acid | Scarlet |
| 31 | The condensation product of 1 mole of β-chloropropionyl chloride and 1 mole of 6-amino-2-(4'-methoxyphenylazo)-1-naphthol-2',3-disulphonic acid | Scarlet |

Table 1-Continued

| No. | | Shade |
|---|---|---|
| 32 | The condensation product of 1 mole of 2,4,5,6-tetrachloropyrimidine and 1 mole of 2-(4'-amino-2'-methylphenylazo)-naphthalene-4,8-disulphonic acid | Yellow |
| 33 | The condensation product of 1 mole of 2,4,6-trichloropyrimidine and 1 mole of 2-(4'-amino-2'-methylphenylazo)-naphthalene-4,8-disulphonic acid | Yellow |
| 34 | The condensation product of 1 mole of 2,4,6-trifluoro-5-chloropyrimidine and 1 mole of 2-(4'-amino-2'-methylphenylazo)-naphthalene-4,8-disulphonic acid | Yellow |
| 35 | The condensation product of 1 mole of 4,5-dichloro-6-methyl-2-methylsulphonyl pyrimidine and 1 mole of 2-(4'-amino-2'-methylphenylazo)-naphthalene-4,8-disulphonic acid | Yellow |
| 36 | The condensation product of 2 moles of 2,4-dichloropyrimidine-5-carbonyl chloride and 1 mole of the 1,2-Cr complex of 6-amino-2-(2'-carboxyphenylazo)-1-naphthol-3-sulphonic acid | Red-Brown |
| 37 | The condensation product of 2 moles of 2,4-dichloro-6-N-ω-sulphomethylanilino-s-triazine and 1 mole of the 1,2-Cr complex of 6-amino-2-(2'-carboxyphenylazo)-1-naphthol-3-sulphonic acid | Red-Brown |
| 38 | The dye of Example 2 reacted with 1 mole of pyridine | Bluish-Red |
| 39 | The dye of Example 2 reacted with 1 mole of trimethylamine | Bluish-Red |
| 40 | The dye of Example 2 reacted with 1 mole of 1,4-diazabicyclo[2,2,2]octane | Bluish-Red |
| 41 | The sulphate ester of 1-amino-4-(3'-β-hydroxyethylsulphonyl)anilino anthraquinone-2-sulphonic acid | Bright-Blue |
| 42 | The sulphate ester of 7-acetylamino-2-(3'-β-hydroxyethylsulphonyl)phenylazo-1-naphthol-3-sulphonic acid | Orange |
| 43 | The condensation product of 1 mole of cyanuric chloride and 1 mole of 4-amino-2'-nitrodiphenylamine-3,4'-disulphonic acid | Yellow |
| 44 | The condensation product of 1 mole of 1,3-bis(2',4'-dichloro-1',3',5'-triazin-6-ylamino)benzene-4,6-disulphonic acid and 1 mole of 3,10-diamino-6,13-dichlorotriphendioxazine-4,11-disulphonic acid | Reddish-blue |
| 45 | The condensation product of 1 mole of 2,4,5,6-tetrachloropyrimidine and 1 mole of the copper complex of N-(2-hydroxy-phenyl-3,5-disulphonic acid)-N'-(2-carboxy-4-aminophenyl)-ms-2-chlorophenyl-formazan | Blue |
| 46 | The condensation product of 1 mole of 2,4-dichloro-6-(β-ethoxy)ethoxy-1,3,5-triazine and 1-amino-4[3'-amino-2',4',6'-trimethylanilino]anthraquinone-2,5'-disulphonic acid | Reddish-blue |
| 47 | The condensation product of 2,4-dichloro-6-di(β-hydroxyethyl)amino-s-triazine with 4-amino-2'-hydroxy-5'-methylazobenzene is further reacted with 1,4-diazabicyclo[2,2,2]octane | Yellow |
| 48 | The condensation product of 2 moles of 2,4-dichloro-6-di(β-hydroxyethyl)amino-s-triazine with 1-(4'-aminophenyl)-3-methyl-4-(3''-aminophenylazo)-5-pyrazolone is further reacted with 1,4-diazabicyclo [2,2,2]octane | Yellow |

In any of the foregoing examples, polyethylene imine may be replaced by polypropylene imine, poly 2-(β-hydroxyethyl) azimidine, poly 2-(β-cyanoethyl)azimidine, or polyethylene imines in which 10% of the available amino groups have been reacted with acrylonitrile, or ethylene chlorohydrin, or dimethyl sulphate.

EXAMPLE 16

1.5 parts of ethyl hydroxyethyl cellulose (low viscosity) are dissolved in 78 parts of perchloroethylene, followed by 0.5 part of the condensate of p-octylphenol with about 7.5 moles of ethylene oxide. Using high speed stirring 20 parts of a 10% aqueous solution of dyestuff No. 25 of the Table is added during 5 minutes and the emulsion so formed stirred at top speed for a further 20 minutes.

10.6 parts of polyethylene imine of M.W. about 100,000 is mixed with 79.4 parts of water and 10.0 parts of a 4% solution of a technical grade of low solids sodium alginate (of pH 5–7 for a 1% solution). The above emulsion is slowly run in, using high speed stirring which is continued for a further 5 minutes after the last of emulsion A has been added.

When this emulsion is printed on to cloth (terylene, terylene/cotton, and mercerised cotton) the fixation is of the order of 95–100% whereas using conventional print pastes with the same dyes in the absence of alkali there is no significant fixation at all.

EXAMPLE 17

44 parts of white spirit are mixed with 8 parts of a condensation product of styrene/vinyl toluene/glycidylmethacrylate copolymer with polyhydroxystearic acid and p-aminobenzoic acid obtained as described below and into this, using a high-speed mixer are added 176 parts of a 10% aqueous solution of the dyestuff named below. Mixing is continued at top speed for 2 minutes after the final addition of the dye solution.

15 parts of the emulsion are mixed into a solution containing 5.83 parts of polyethylene-imine of M.W. approx. 60,000, 1.0 part of a 1% aqueous solution of skin gelatin, 0.15 part of a solution of cetyl trimethyl ammonium bromide, 0.3 part of sodium chloride and 7.65 parts of water.

The resulting paste is fluid, very stable and gives prints of good fixation.

Using as dyestuff the condensation product of cyanuric chloride with 1 mole of 1-amino-4-(2',4'6'-trimethyl-5'-aminoanilino) anthraquinone-2,3'-disulphonic acid and 1 mole of 2-m-sulphoanilino-4-β-aminoethylamino-6-chloro-s-triazine, a very bright reddish-blue shade is obtained.

The copolymer used in the above Example is obtained by 1. heating a solution of 900 parts of polyhydroxystearic acid (of MW 1800), 134 parts of glycidyl methacrylate, 1 part of hydroquinone and 2 parts of dimethyl laurylamine in 900 parts of white spirit at 140°C to give an ester of acid value less than 1 mg KOH/g.

2. heating 387 parts of the resultant solution with 112 parts of vinyl toluene, 8 parts of azodisobutyronitrile and 70 parts of styrene in 400 parts of white spirit with periodic additions of further portions of catalyst, for 12 hours.

3. heating 500 parts of the resulting solution with 3.5 parts of p-aminobenzoic acid and 0.2 part of dimethyllaurylamine until an acid value of 0.2 mg KOH/g was achieved and diluting to 40% by weight solids content.

What we claim is:

1. A process for the coloration of cellulose textile materials or cellulose/polyester textile materials which comprises impregnating the textile material with a polyethyleneimine having a molecular weight ranging from 600 to 100,000 and subsequently contacting the textile material with a fiber-reactive dye.

2. A process as claimed in claim 1 wherein the dye used contains a s-triazine nucleus carrying a cellulose-reactive substituent.

3. A process as claimed in claim 2 wherein the cellulose-reactive substituent is a chlorine atom.

4. A process as claimed in claim 2 wherein the cellulose-reactive substituent is a quaternary ammonium group.

5. The process of claim 1 wherein the said textile material is padded or printed with a padding solution or printing paste containing a water-in-oil-in-water emulsion having the said dyestuff and the said polyethyleneimine dissolved or dispersed in separate aqueous phases.

* * * * *